(12) United States Patent
Gupta et al.

(10) Patent No.: US 11,863,672 B1
(45) Date of Patent: Jan. 2, 2024

(54) SYSTEMS AND METHODS FOR REFRESHING ENCRYPTION AND DECRYPTION KEYS AND SIGNATURES FOR A REALTIME PIPEPILINE

(71) Applicant: INTUIT INC., Mountain View, CA (US)

(72) Inventors: Gautam Gupta, Mountain View, CA (US); Husenibhai Kathiria, Mountain View, CA (US); Shraddha Shah, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/302,170

(22) Filed: Apr. 18, 2023

(51) Int. Cl.
*H04L 9/08* (2006.01)

(52) U.S. Cl.
CPC .......... *H04L 9/0894* (2013.01); *H04L 9/0825* (2013.01); *H04L 9/0891* (2013.01)

(58) Field of Classification Search
None
See application file for complete search history.

(56) References Cited

U.S. PATENT DOCUMENTS

| | | | |
|---|---|---|---|
| 8,594,335 B1* | 11/2013 | Izhar | H04L 63/06 713/153 |
| 10,742,422 B1* | 8/2020 | Jarjoui | G06Q 20/3825 |
| 11,240,007 B1* | 2/2022 | Higgins | H04L 9/3268 |
| 2013/0121489 A1* | 5/2013 | Pestoni | H04N 21/2347 380/278 |
| 2015/0039889 A1* | 2/2015 | Andoni | H04L 9/3263 713/170 |
| 2020/0177375 A1* | 6/2020 | Buck | H04L 9/0836 |
| 2022/0161039 A1* | 5/2022 | Manicka | H04W 12/06 |
| 2023/0107953 A1* | 4/2023 | Guan | G06F 8/65 713/153 |

* cited by examiner

*Primary Examiner* — Bassam A Noaman
(74) *Attorney, Agent, or Firm* — DLA PIPER LLP (US)

(57) ABSTRACT

Systems and methods are provided for refreshing encryption and decryption keys. The disclosed techniques can improve refreshing encryption keys by allowing for the process to be automated, preventing downtime in each system and reducing developer labor in preparing and facilitating the exchange. In addition, the embodiments of the present disclosure can enable organizations to store keys (both old keys and newly generated keys) along with metadata in a known location accessible to the other organization.

18 Claims, 5 Drawing Sheets

SYSTEMS AND METHODS FOR REFRESHING ENCRYPTION AND DECRYPTION KEYS AND SIGNATURES FOR A REALTIME PIPEPILINE

BACKGROUND OF THE DISCLOSURE

Two different organizations that operate on separate systems wish to integrate these systems so that they communicate with each other. Occasionally, rather than fully merging the systems, these organizations may elect to configure the systems such that they exchange data on an ongoing basis. For example, a bi-directional data-flow pipeline could be created that enables the cross-system exchange of data. However, a bi-directional data-flow pipeline that exchanges data across separate organizations will involve encryption protocols at both ends to comply with security and confidentiality requirements.

One type of encryption protocol that bi-directional data-flow pipelines can utilize is asymmetric encryption or public-key encryption/cryptography, which uses two keys to handle data protection. Asymmetric encryption involves using a key-pair, which includes public key and a private key. The public key is used to encrypt data, and the private key is used to decrypt the data. However, whereas the public keys are openly distributed, the private keys are kept secret. This provides only approved entities with decryption rights. In a bi-directional data-flow application, both organizations typically generate a key-pair and share the public key with the other organization. Each organization would then encrypt its data with the other's public key, add a signature, and transmit it to the other organization via the pipeline. The other organization can verify the signature and then decrypt the data with the appropriate private key. If the signature is not verified, the received data envelope may not be initiated from the authorized source and the payload is dropped.

In addition, various encryption compliance regulations generally require that key-pairs be renewed or refreshed every so often, such as e.g., every ninety days. However, the renewal process is manual and can be quite cumbersome, expensive, and tedious. In addition, refreshing the key-pairs will lead to downtime in both the systems while they are re-configured to operate with the refreshed key-pairs. Organizations will often use separate key-pairs for different topics or sectors and refreshing key-pairs across multiple topics exacerbates the downtime and tedium, which is undesirable.

DESCRIPTION

The following detailed description is merely exemplary in nature and is not intended to limit the claimed invention or the applications of its use.

Embodiments of the present disclosure relate to systems and methods for refreshing encryption keys. The disclosed techniques improve refreshing encryption keys by allowing for the process to be automated, preventing downtime in each system, and reducing developer labor in preparing and facilitating the exchange. In particular, the embodiments of the present disclosure enable organizations to store keys (both old keys and newly generated keys) along with metadata in a known location accessible to the other organization. The system can utilize processes, such as lambda functions, to periodically poll the storage locations for newly generated keys. Once a new key is found, the system analyzes information in the associated metadata (e.g., version information, payload data, entity data, signature details, encryption details, etc.) to determine whether the key is appropriate to use for encryption (or decryption), as well as whether the signature is verified. In addition, each system can be configured to implement a transitional time-period where multiple keys will work. For example, in this time-period, both the most recently generated key and the previous version will be enabled for encryption and decryption. This therefore allows the pipeline (and both systems) to continually operate while the key-pair is refreshed without shutting down or emptying the pipeline.

Figure 1:
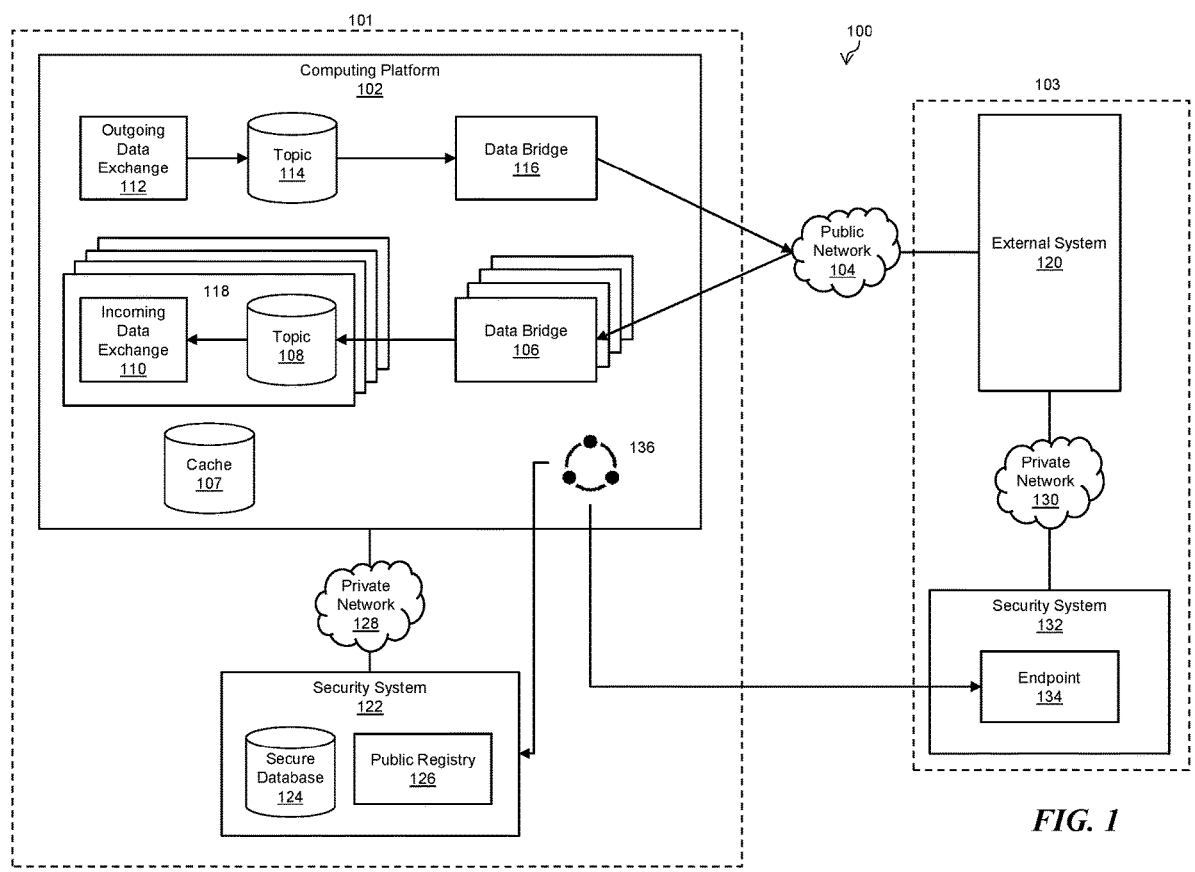
FIG. 1 is a block diagram of an example system for refreshing encryption keys according to example embodiments of the present disclosure.

FIG. 1 is a block diagram of an example system 100 for refreshing encryption keys according to example embodiments of the present disclosure. The system 100 can include a computing platform 102 and a security system 122 that are part of a first organization 101, which is designated by the dotted line on the left. The computing platform 102 and the security system 122 are communicably coupled via a private network 128, which can be an internal network such as a virtual private network (VPN).

In addition, the computing platform 102 is connected to a separate second organization 103 (which is designated by the dotted line on the right) via the public network 104 or other network. The second organization 103 can similarly include an external system 120 that is communicably coupled to a security system 132 via a private network 130, which can be an internal network such as a VPN. Furthermore, the security system 132 can include a public endpoint 134. The two organizations 101 and 103 are connected to facilitate a bi-directional exchange of data.

The networks 128 and 130 can include one or more wide areas networks (WANs), metropolitan area networks (MANs), local area networks (LANs), personal area networks (PANs), or any combination of these networks. The networks 128 and 130 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The networks 128 and 130 can also use standard communication technologies and/or protocols.

In some embodiments, the computing platform 102 can include any combination of one or more of web servers, mainframe computers, general-purpose computers, personal computers, serverless computing frameworks, or other types of computing systems. The computing platform 102 may represent distributed servers that are remotely located and communicate over a communications network, or over a dedicated network such as a local area network (LAN). The computing platform 102 may also include one or more back-end servers for carrying out one or more aspects of the present disclosure. In some embodiments, the computing platform 102 may include servers the same as or similar to server 500 described below in the context of FIG. 5.

As shown in FIG. 1, the computing platform 102 includes an outgoing data exchange 112 and an incoming data exchange 110. The outgoing data exchange 112 can serve as a source of data to be shared with the second organization 103. The data from the outgoing data exchange 112 is transmitted via a topic 114 through a data bridge 116 and to the external system 120 over the public network 104. In some embodiments, the topic 114 can be a Kafka topic or other virtual group or log that holds messages and events for transmission in a logical order. In some embodiments, the data bridge 116 is configured to encrypt the outgoing data with the public key of the second organization 103 and sign the data with a signature. The external system 120 can then decrypt the shared data with their private key and process the data from the first organization 101, as desired.

In addition, the computing platform 102 includes an incoming data exchange instances 118 (generally referred to herein as an "instance 118" or collectively referred to herein as "instances 118") each comprising an incoming data exchange 110 and a topic 108. In some embodiments, the topic 108 can be a Kafka topic or other virtual group or log that holds messages and events for transmission in a logical order. Each instance 118 can be associated with a different sector of the first organization 101, such as importing of regular data, notifications for users, tax e-filing, tax returns, among many others. Further, these are merely exemplary in nature. In addition, each instance 118 is configured to receive incoming data (e.g., messages and events) from a data bridge 106, which receives encrypted data from the external system 120 of the second organization 103. The incoming data will have been encrypted by the external system 120 with the first organization 101's public key, and the various data bridges 106 decrypt the incoming data with the associated private key and verify the relevant signatures.

The security system 122 of the first organization 101 includes a secure database 124 and a public registry 126. In some embodiments, the secure database 124 can store private keys for use by the first organization 101 in decrypting information received from the second organization 103, as well as other secret and/or confidential information. In addition, the public registry 126 can store the first organization 101's public keys so that they are accessible by the second organization 103 to encrypt the information sent to the first organization 101. In addition, the security system 122 can be configured to generate new key-pairs.

In addition, the computing platform 102 can include a lambda function 136. The lambda function 136 can be configured to perform various functions. For example, the lambda function 136 can poll the security system 122 for newly generated key-pairs, in particular for the private keys of newly generated key-pairs. In some embodiments, the lambda function 136 can poll the security system 122 periodically at pre-defined intervals, such as every five or ten minutes. In addition, the lambda function 136 can be configured to poll the endpoint 134 of the second organization 103 for newly generated key-pairs, in particularly for the public key of newly generated key-pairs. Moreover, the lambda function 136 can be configured to store newly generated private keys (of organization 101) and newly generated public keys (of organization 103) in the cache 107.

Figure 2:
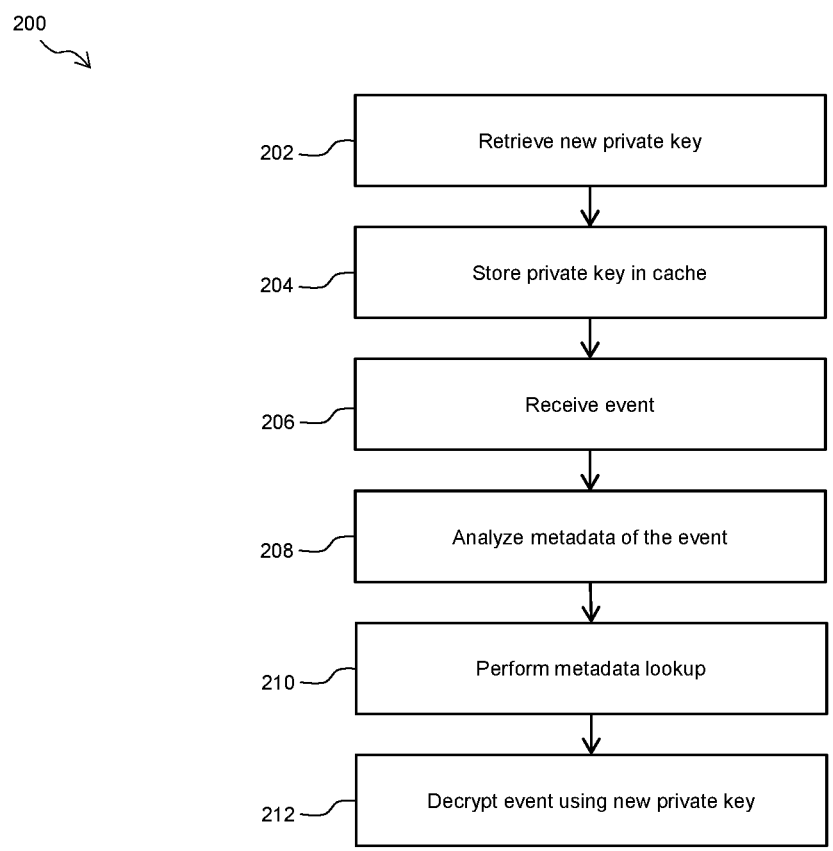
FIG. 2 is a flowchart of an example process for decrypting data using a refreshed key according to example embodiments of the present disclosure.

FIG. 2 is a flowchart of an example process 200 for decrypting data using a refreshed key according to example embodiments of the present disclosure. In some embodiments, process 200 can be performed by the computing platform 102 of FIG. 1 and is therefore performed from the perspective of the first organization 101. Similar processes may be performed by the second organization 103, although this is not necessarily required. At block 202, the computing platform 102 retrieves a new private key, such as from the security system 122 or other component in which new key-pairs are generated. In some embodiments, retrieving a new private key can be performed by the lambda function 136. For example, the lambda function 136 can poll the security system 122 to obtain newly generated private keys. In some embodiments, the polling can be performed periodically at pre-defined intervals, such as e.g., every five or ten minutes. At block 204, after retrieving the new private key, the lambda function 136 stores the new private key, such as in the cache 107. In some embodiments, previous private keys can remain stored in the cache 107.

At block 206, the computing platform 102 receives an event from the second organization 103. In some embodiments, the event can include various types of data and serves to exchange data in "packets" or "messages," such as a JSON format that is transmitted as an envelope. For example, the event can be received over the internet (e.g., public network 104) at a data bridge 106. The event is received in an encrypted format and can contain metadata (e.g., version information of the public key used to encrypt the event, payload data, entity data, signature details, encryption details, etc.). At block 208, the computing platform 102 evaluates the metadata of the received event. In some embodiments, analyzing the metadata can include identifying a specific, predefined piece of information, such as the version information. At block 210, the computing platform 102 performs a metadata lookup. In some embodiments, the lookup can include querying the cache 107 with the version information received with the event to find a private key with matching version information (i.e., the new private key received at block 202). Then, at block 212, in response to finding the private key with matching version information, the computing platform 102 decrypts the event using the new private key. From here, the first organization 101 now has access to the information contained in the event and can process it in various ways.

Figure 3:
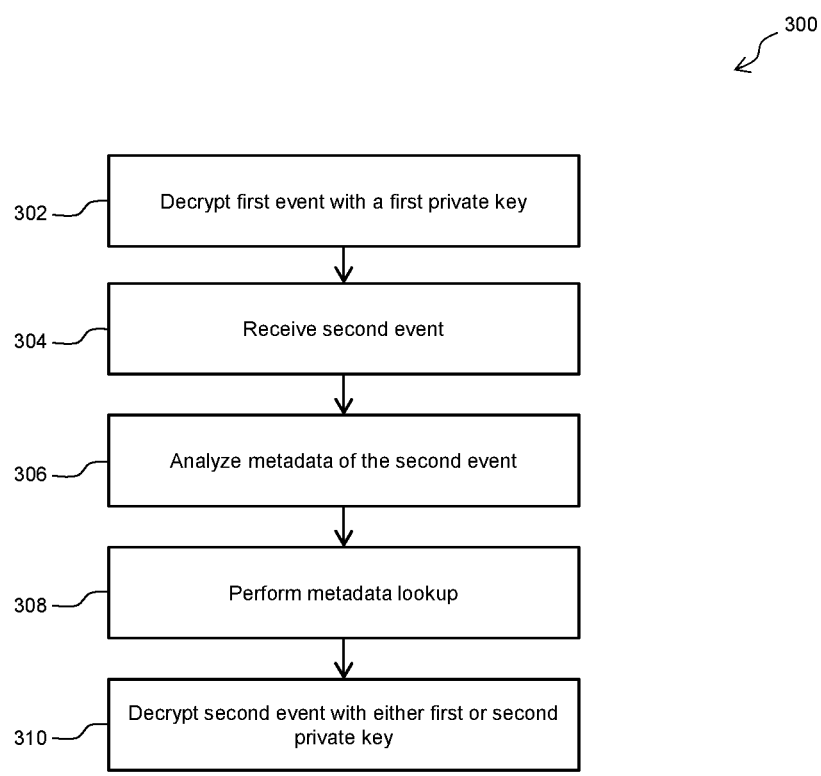
FIG. 3 is flowchart of another example process for decrypting data using a refreshed key according to example embodiments of the present disclosure.

FIG. 3 is a flowchart of another example process 300 for decrypting data using a refreshed key according to example embodiments of the present disclosure. In some embodiments, process 300 can be performed by the computing platform 102 of FIG. 1 and is therefore performed from the perspective of the first organization 101. Similar processes may be performed by the second organization 103, although this is not necessarily required. At block 302, the computing platform 102 decrypts a first event received from the second organization 103 with a first private key. At block 304, the computing platform receives a second event from the second organization 103. As described above in relation to FIG. 2, the event can include various types of data and serves to exchange data in "packets" or "messages," such as the JSON format that is transmitted as an envelope. The second event is received in an encrypted format and can contain metadata (e.g., version information of the public key used to encrypt the event, payload data, entity data, signature details, encryption details, etc.).

At block 306, the computing platform 102 evaluates the metadata of the second event. For example, the computing platform 102 can identify a specific, predefined piece of information, such as the version information. At block 308, the computing platform 102 performs a metadata lookup, such as by querying the cache 107 with the version information received with the second event to find a private key with matching version information. At block 310, the computing platform 102 decrypts the second event with either the first or second private key. For example, if the lookup of the version information from the second event's metadata yields a match to the second private key, then the computing platform 102 will decrypt the second event with the second private key. In addition, if the second event was received within a predefined transitional period, then the computing platform 102 can also decrypt the second event with the first private key. In some embodiments, the predefined transitional period is configured in the system as a period of time (e.g., ten days) following the generation of new key-pairs in which multiple keys will work, such as the newly generated key-pairs and the most recent version. Such a transitional period can prevent either system (of organization 101 or organization 103) from experiencing downtime.

Figure 4:
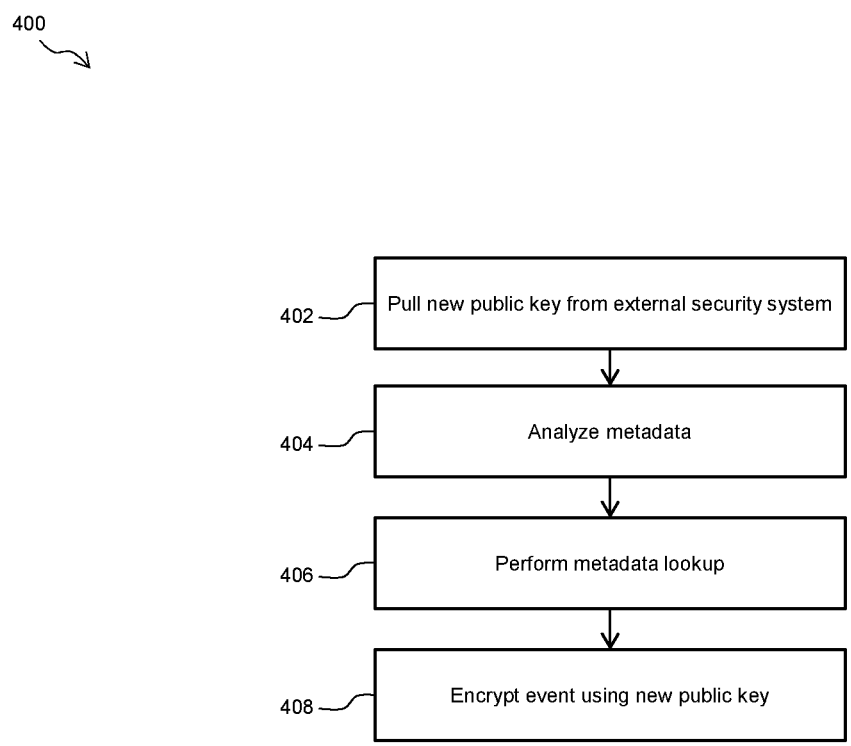
FIG. 4 is a flowchart of an example process for encrypting data using a refreshed key according to example embodiments of the present disclosure.

FIG. 4 is a flowchart of an example process 400 for encrypting data using a refreshed key according to example embodiments of the present disclosure. In some embodiments, process 400 can be performed by the computing platform 102 of FIG. 1 and is therefore performed from the perspective of the first organization 101. Similar processes may be performed by the second organization 103, although this is not necessarily required. At block 402, the computing platform 102 pulls a new public key from an external security system 132, such as the endpoint 134 of organization 103. For example, the lambda function 136 can poll the endpoint 134 to obtain newly generated public keys. In some embodiments, the polling can be performed periodically at pre-defined intervals, such as every five or ten minutes.

At block 404, the computing platform 102 evaluates the metadata of the second event, which can be received from the endpoint 134. For example, the computing platform 102 can identify a specific, predefined piece of information, such as the version information. At block 406, the computing platform 102 performs a metadata lookup, such as by querying the cache 107 with the version information received with the second event to find a new public key with matching version information. At block 408, the computing platform 102 encrypts data using the new public key. The encrypted data can form an event, which can then be transmitted over the public network 104 to the organization 103 for their own decryption and processing.

Figure 5:
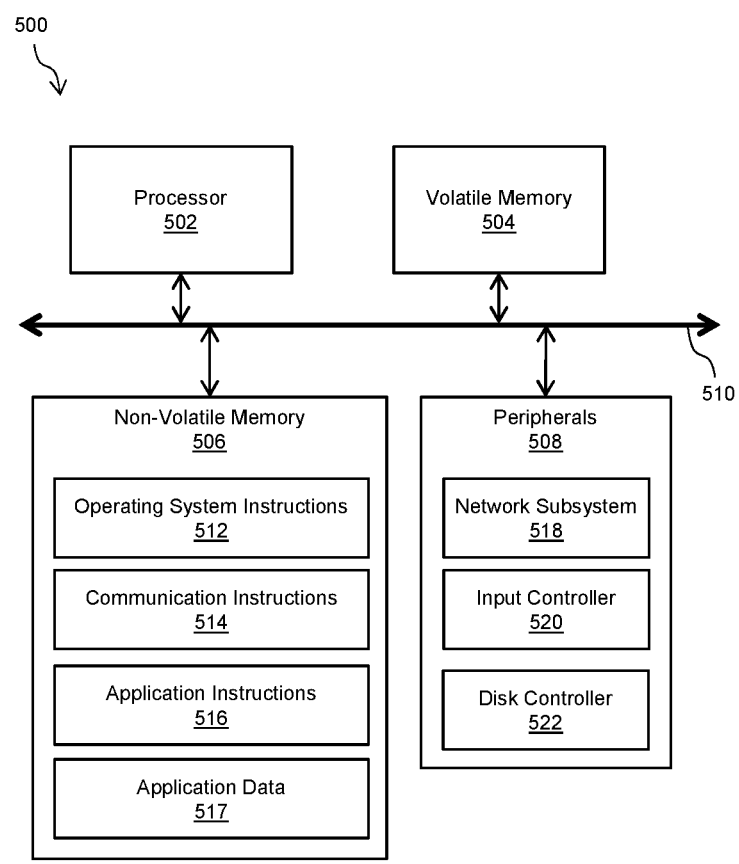
FIG. 5 is an example server device that can be used within the system of FIG. 1 according to an embodiment of the present disclosure.

FIG. 5 is a diagram of an example server device 500 that can be used within system 100 of FIG. 1. Server device 500 can implement various features and processes as described herein. Server device 500 can be implemented on any electronic device that runs software applications derived from complied instructions, including without limitation personal computers, servers, smart phones, media players, electronic tablets, game consoles, email devices, etc. In some implementations, server device 500 can include one or more processors 502, volatile memory 504, non-volatile memory 506, and one or more peripherals 508. These components can be interconnected by one or more computer buses 510.

Processor(s) 502 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 510 can be any known internal or external bus technology, including but not limited to ISA, EISA, PCI, PCI Express, USB, Serial ATA, or FireWire. Volatile memory 504 can include, for example, SDRAM. Processor 502 can receive instructions and data from a read-only memory or a random access memory or both. Essential elements of a computer can include a processor for executing instructions and one or more memories for storing instructions and data.

Non-volatile memory 506 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 can store various computer instructions including operating system instructions 512, communication instructions 514, application instructions 516, and application data 517. Operating system instructions 512 can include instructions for implementing an operating system (e.g., Mac OS®, Windows®, or Linux). The operating system can be multi-user, multiprocessing, multitasking, multithreading, real-time, and the like. Communication instructions 514 can include network communications instructions, for example, software for implementing communication protocols, such as TCP/IP, HTTP, Ethernet, telephony, etc. Application instructions 516 can include instructions for various applications. Application data 517 can include data corresponding to the applications.

Peripherals 508 can be included within server device 500 or operatively coupled to communicate with server device 500. Peripherals 508 can include, for example, network subsystem 518, input controller 520, and disk controller 522. Network subsystem 518 can include, for example, an Ethernet of WiFi adapter. Input controller 520 can be any known input device technology, including but not limited to a keyboard (including a virtual keyboard), mouse, track ball, and touch-sensitive pad or display. Disk controller 522 can include one or more mass storage devices for storing data files; such devices include magnetic disks, such as internal hard disks and removable disks; magneto-optical disks; and optical disks.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for decrypting data using a refreshed key comprising:
retrieving a first private key from an internal system;
storing the first private key in a cache;
receiving a first event and first metadata from an external system;
analyzing the first metadata of the first event;
performing a lookup of the first metadata in the cache;
decrypting the first event using the first private key in response to detecting a match in the cache;
receiving a second event and second metadata from an external system;
analyzing the second metadata of the second event;
performing a lookup of the second metadata in the cache;
identifying a second private key in the internal system;
selecting one of the first private key or the second private key, wherein selecting one of the first private key or the second private key comprises:
selecting the first private key in response to the lookup of the second metadata not yielding a match within a predefined transitional period after a key-pair refresh, otherwise, selecting the second private key;
decrypting the second event with the selected private key;
pulling a new public key from the external system;
analyzing third metadata from an endpoint connected to the external system; performing a lookup of the third metadata in the cache; and
encrypting a third event with the new public key.

2. The computer-implemented method of claim 1, wherein retrieving the first private key from the internal system comprises retrieving the first private key via a lambda function.

3. The computer-implemented method of claim 2, wherein retrieving the first private key from the internal system via the lambda function comprises polling the internal system at a pre-defined interval.

4. The computer-implemented method of claim 3, wherein polling the internal system at the pre-defined interval comprises polling at an interval between five and ten minutes.

5. The computer-implemented method of claim 2, wherein storing the first private key in the cache comprises storing the first private key in the cache via the lambda function.

6. The computer-implemented method of claim 1, wherein receiving the first and second metadata comprises receiving at least one of key-pair version information, payload data, entity data, signature details, or encryption details.

7. The computer-implemented method of claim 6, wherein performing the lookup of the first and second metadata in the cache comprises querying the cache with a respective version information to find the private key.

8. The computer-implemented method of claim 1, wherein decrypting the second event comprises decrypting the second event with the second private key in response to identifying the second private key in the cache via the lookup of the second metadata.

9. The computer-implemented method of claim 1, wherein the predefined transitional period comprises ten days from the key-pair refresh.

10. A computing system comprising:
a processor; and a non-transitory computer-readable storage device storing computer-executable instructions, the instructions operable to cause the processor to perform operations comprising:
retrieving a first private key from an internal system;
storing the first private key in a cache;
receiving a first event and first metadata from an external system;
analyzing the first metadata of the first event;
performing a lookup of the first metadata in the cache;
decrypting the first event using the first private key in response to detecting a match in the cache;
receiving a second event and second metadata from an external system;
analyzing the second metadata of the second event;
performing a lookup of the second metadata in the cache;
identifying a second private key in the internal system;
selecting one of the first private key or the second private key, wherein selecting one of the first private key or the second private key comprises:
selecting the first private key in response to the lookup of the second metadata not yielding a match within a predefined transitional period after a key-pair refresh, otherwise, selecting the second private key;
decrypting the second event with the selected private key;
pulling a new public key from the external system;
analyzing third metadata from an endpoint connected to the external system;
performing a lookup of the third metadata in the cache; and
encrypting a third event with the new public key.

11. The computing system of claim 10, wherein retrieving the first private key from the internal system comprises retrieving the first private key via a lambda function.

12. The computing system of claim 11, wherein retrieving the first private key from the internal system via the lambda function comprises polling the internal system at a pre-defined interval.

13. The computing system of claim 12, wherein polling the internal system at the pre-defined interval comprises polling at an interval between five and ten minutes.

14. The computing system of claim 11, wherein storing the first private key in the cache comprises storing the first private key in the cache via the lambda function.

15. The computing system of claim 10, wherein receiving the first and second metadata comprises receiving at least one of key-pair version information, payload data, entity data, signature details, or encryption details.

16. The computing system of claim 15, wherein performing the lookup of the first and second metadata in the cache comprises querying the cache with a respective version information to find the private key.

17. The computing system of claim 10, wherein decrypting the second event comprises decrypting the second event with the second private key in response to identifying the second private key in the cache via the lookup of the second metadata.

18. The computing system of claim 10, wherein the predefined transitional period comprises ten days from the key-pair refresh.

\* \* \* \* \*